B. COLBERT.
MULTIPHASE SPRING MOTOR.
APPLICATION FILED SEPT. 24, 1915. RENEWED APR. 18, 1918.
1,271,437.
Patented July 2, 1918.
5 SHEETS—SHEET 1.
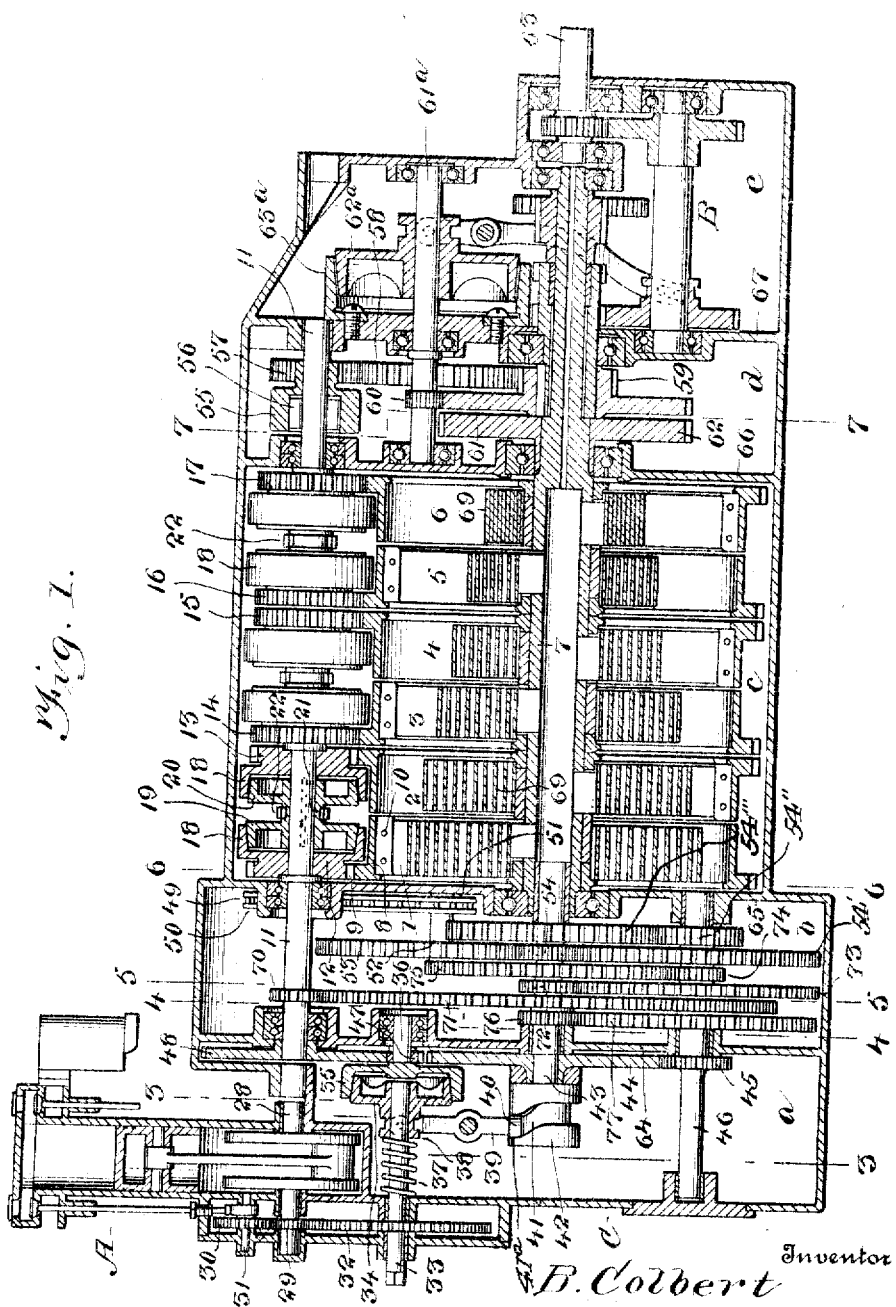

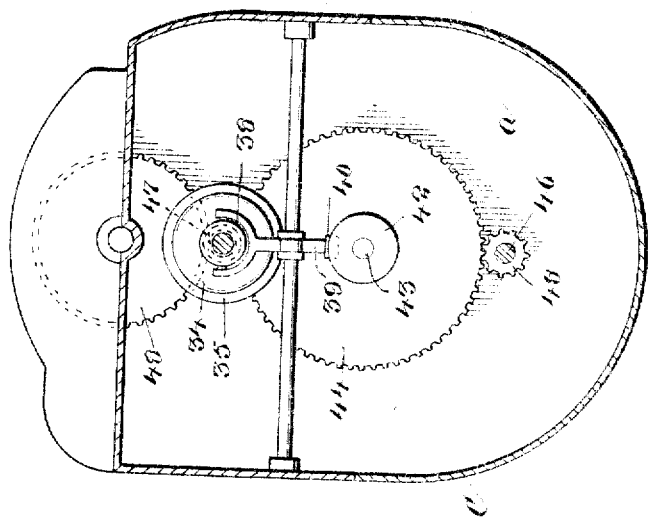
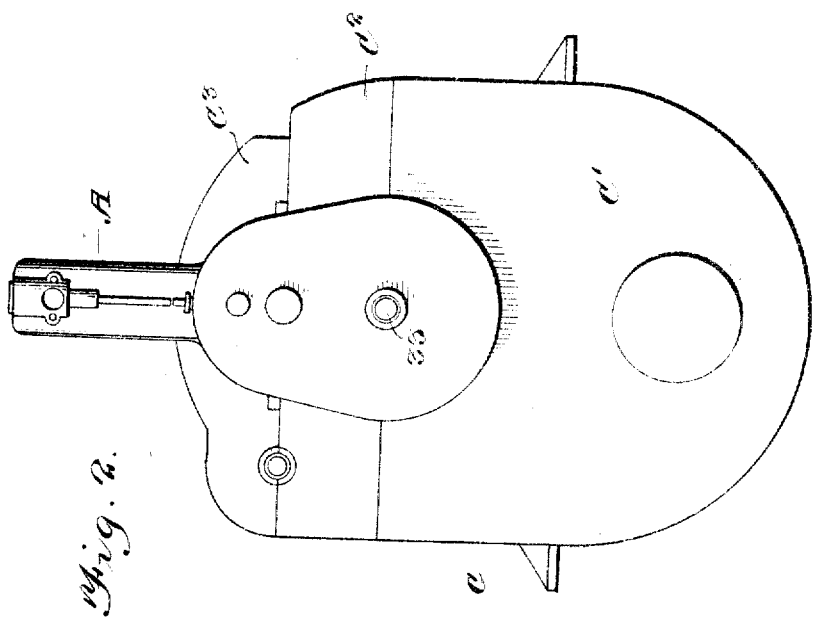

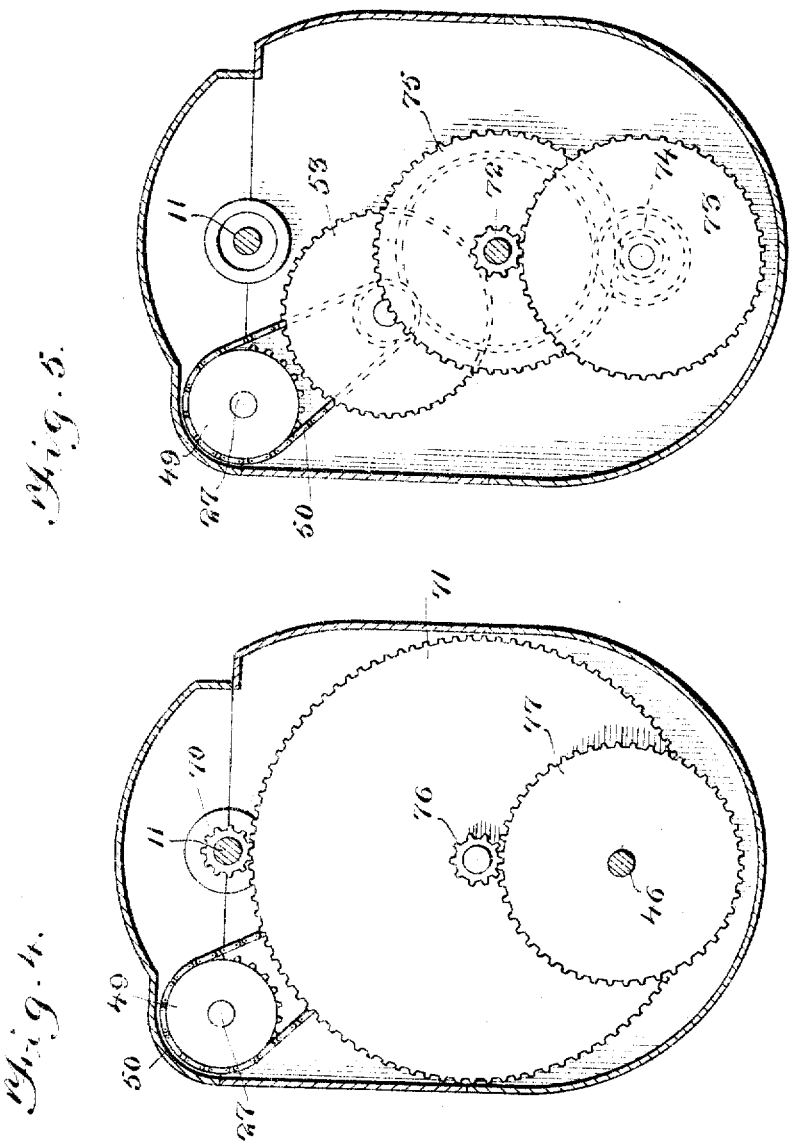

B. COLBERT.
MULTIPHASE SPRING MOTOR.
APPLICATION FILED SEPT. 24, 1915. RENEWED APR. 18, 1918.
1,271,437.
Patented July 2, 1918.
5 SHEETS—SHEET 4.
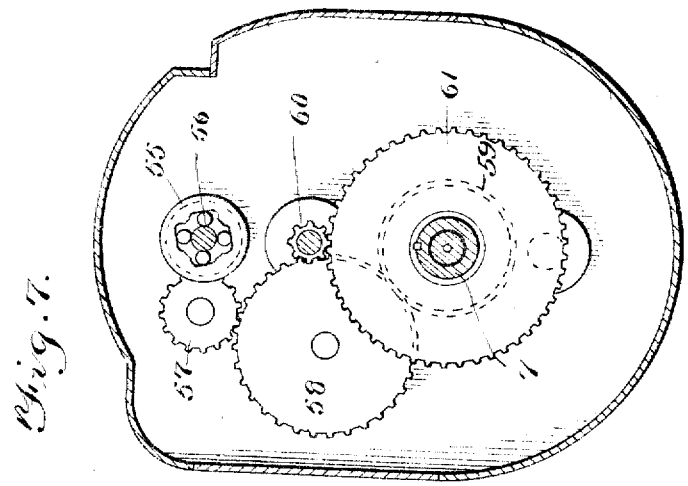
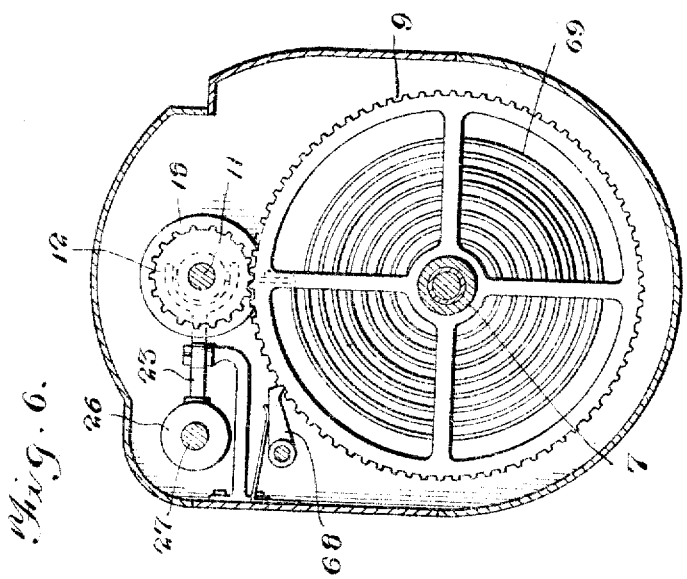
Witnesses
E. R. Rupskuf
R. M. Smith
Inventor
B. Colbert
By Victor J. Evans
Attorney

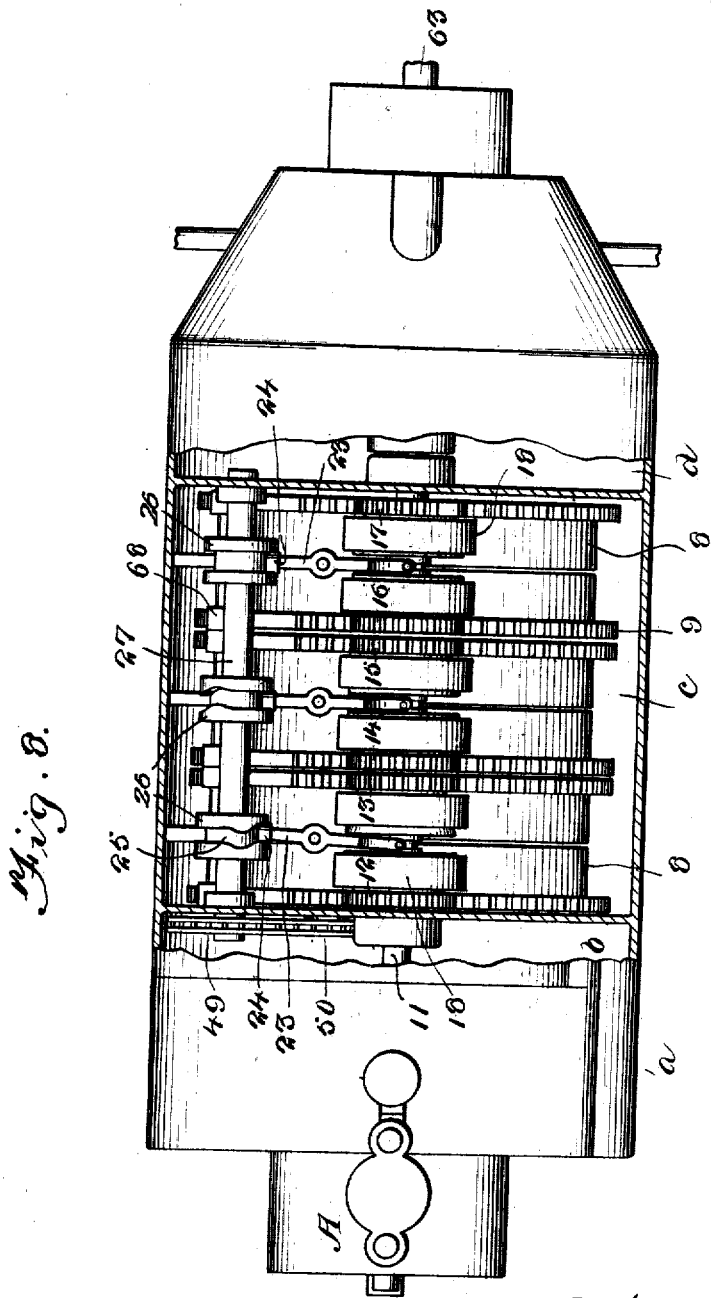

UNITED STATES PATENT OFFICE.

BRADFORD COLBERT, OF PINE BLUFF, ARKANSAS.

MULTIPHASE SPRING-MOTOR.

1,271,437.  Specification of Letters Patent.  Patented July 2, 1918.

Application filed September 24, 1915. Serial No. 52,501. Renewed April 18, 1918. Serial No. 229,419.

*To all whom it may concern:*

Be it known that I, BRADFORD COLBERT, a citizen of the United States, residing at Pine Bluff, in the county of Jefferson and State of Arkansas, have invented new and useful Improvements in Multiphase Spring-Motors, of which the following is a specification.

This invention relates to multi-phase spring motors, the object of the invention being to produce a motor of the class referred to embodying a series of energy storing springs arranged to transmit their energy to a common main shaft, the power of which may be utilized for any desired purpose.

One of the principal objects of the present invention is to provide novel spring winding mechanism which is entirely automatic in operation and which will effect the individual winding of the springs successively.

A further object of the invention is to provide spring winding mechanism by means of which each spring may be wound to a certain predetermined extent only, thereby preventing the leaves or convolutions of the springs from becoming bound; also means for disconnecting the spring winding mechanism from one spring as soon as it has become sufficiently wound and immediately connecting the winding mechanism to the succeeding spring, the springs being thus successively wound or placed under tension without interfering with any of the others which continue to transmit their energy to the main shaft.

A further object of the invention is to provide means in connection with the main shaft and series of energy storing springs whereby the surplus energy of the wound or partially wound springs may be utilized to wind or place under tension a spring the energy of which has been reduced to a predetermined minimum.

Another object of the invention is to provide in connection with a spring motor of the class referred to, an auxiliary motor which is automatically thrown into operation when the total energy of the spring motor has been reduced to a predetermined minimum, said auxiliary engine thereafter acting to rewind the springs of the spring motor.

Another object of the invention is to provide means whereby the auxiliary motor is thrown out of operation when the energy of the spring motor attains a predetermined maximum.

With the above and other objects in view, the invention consists in the novel construction, combination and arrangement of parts, as herein described, illustrated and claimed.

In the accompanying drawings:—

Figure 1 is a longitudinal section taken through the spring motor of this invention in line with the main and spring winding shafts.

Fig. 2 is an end elevation of the motor looking toward that end where the auxiliary motor is located.

Fig. 3 is a cross section on the line 3—3 of Fig. 1.

Fig. 4 is a cross section on the line 4—4 of Fig. 1.

Fig. 5 is a section on the line 5—5 of Fig. 1.

Fig. 6 is a section on the line 6—6 of Fig. 1.

Fig. 7 is a section on the line 7—7 of Fig. 1.

Fig. 8 is a plan view, partly broken away, in section, of the motor.

A series of energy storing convolute springs is indicated at 1, 2, 3, 4, 5 and 6, said springs being shown as having their inner extremities attached to the main power shaft 7 of the motor. It is well to state at this point that any desired number of springs 1, 2, 3, etc., may be employed in accordance with the desire of the manufacturer and the total maximum power of the engine.

In the preferred embodiment of this invention each of the springs hereinabove referred to is mounted within a rotary winding drum 8 and said drum is provided with a gear face 9 the purpose of which will presently appear. The outer extremity of each spring is fastened at 10 to the inside of the drum so that as the drum 8 is revolved, the respective spring is wound from the outside and subsequently the energy of said spring is transmitted from the inner end thereof to the shaft 7.

Parallel to the shaft 7 is a spring winding shaft 11 which has normally loose thereon gear pinions 12, 13, 14, 15, 16 and 17 which mesh with the gear faces 9 of the respective winding drums 8 for the purpose of imparting rotary motion to said drums. The spring winding shaft 11 is driven continuously at a constant speed by means to be hereinafter described. Each of the pinions 12 to 17 inclusive is, in the preferred embodiment of this invention, provided with a female clutch member or rim 18 adapted to be engaged by one of the clutch faces 19 and 20 of one of a series of male clutch members 21 as clearly shown in Fig. 1, the clutch member 21 being feathered to and slidable on the shaft 11 so that when moved in one direction it will engage the clutch face 18 of the adjacent pinion 12, for example, and when moved in the other direction will engage the clutch face 18 of the adjacent pinion 13. The clutch member 21 can only engage one female clutch member at a time. Each clutch member 21 is shifted by the fork 22 of a rocker arm 23 which is provided with a roller 24 which works in a cam groove 25 of a cam 26 mounted fast on a cam shaft 27 parallel to the winding shaft 11 and driven by means hereinafter described at a uniform speed. The cams 26 with their cam grooves are so arranged relatively to each other along the cam shaft 27 that the clutch faces 19 and 20 are successively moved into engagement with the clutch faces of the pinions 12 to 17, thereby winding the springs in series or successively.

For primarily winding the springs and storing energy therein and for subsequently rewinding said springs after the energy thereof has been reduced to a predetermined minimum, I employ an auxiliary motor designated generally at A and shown in the form of a single cylinder internal combustion engine of comparatively low power, for example, one-half H. P. or one H. P. As the auxiliary motor A is of the ordinary four cycle type, being clearly illustrated in longitudinal section in Fig. 1, it will only be necessary to describe the relation thereof to the spring motor. The crank shaft 28 of the motor A has thereon a pinion 29 which meshes at one side with a gear 30 which operates the cam shaft 31 of the motor A. At the opposite side the pinion 29 meshes with a large gear 32 fast on a clutch shaft 33 carrying a male clutch member 34 which under certain conditions engages a female clutch member 35 on a short pinion shaft 36, the clutch member 34 being feathered to the shaft 33 and slidable longitudinally thereof and being normally pressed toward the clutch member 35 by means of a coiled expansion spring 37. The clutch member 34 is provided with a grooved collar or hub 38 which is engaged by the forked extremity of a rocker arm 39 carrying a roller 40 which engages the cam groove 41 of a cam 42 fast on a shaft 43 driven by means of a large gear 44 fast thereon and meshing with and being driven by a pinion 45 on a counter shaft 46 driven by means hereinafter described.

Fast on the pinion shaft 36 is a pinion 47 which meshes with and drives a large gear 48 on one end of the winding shaft 11 hereinabove described. It will therefore now be understood that the power of the auxiliary motor A is transmitted through the connections described to the winding shaft 11, the latter rotating at a comparatively low rate of speed as compared with the speed of the crank shaft 28 of the auxiliary motor A and during the rotation of the shaft 11, the springs 1 to 6 inclusive are successively wound in the manner hereinabove stated.

The cam shaft 27 has fast thereon a wheel 49 from which a belt or chain 50 extends around a wheel 51 mounted on a short stub shaft 52, the wheel 51 being driven by a spur gear 53 having a fixed relation to the wheel 51 and mounted on the same stub shaft 52, said wheel 53 being driven by a pinion 54 forming one of a train of speed reducing gears, hereinafter more particularly described.

The train of gears 54', 54'' and 54''', shown in connection with the pinion 54, to the right and below said pinion, serve as a speed reduction for the shaft 43 and the cam 42, the shaft 43 being attached to the pinion 54 by a sleeve or hollow shaft connection as shown.

55 designates an overrunning clutch containing hardened steel rollers 56 which are adapted to grip the adjacent end of the winding shaft 11 as shown in Fig. 1, said overrunning clutch 55 driven by a pinion 57 which meshes with and is driven by a gear 58 in turn driven by other gears 59, 60, the gears 59 and 61 being fast on the main shaft 7 of the motor. A gear 62 on the shaft 7 may be used to transmit power to any outside mechanism of a lighter character, said gear 62 bearing no other relation to the mechanism of the motor proper. B generally designates transmission gearing or gearing by means of which the speed of the driven shaft 63 may be regulated as compared with the speed of the main shaft 7, the said transmission gearing being of any usual or desired construction.

All of the mechanism hereinabove described is inclosed in a casing or housing designated generally at C, the same being divided by partitions 64, 65, 66 and 67 into a series of compartments $a$, $b$, $c$, $d$ and $e$, the compartment $a$ containing the mechanism for automatically throwing the auxiliary motor A into and out of operation, the compartment $b$ containing the main train of gears, the compartment $c$ forming a housing for the energy storing springs and the pinions and clutches for winding the same, the compartment $d$ containing the overrunning clutch mechanism, and the compartment $e$ containing the speed changing or transmission mechanism. Furthermore, the casing C is divided into a main lower and lubricant containing section C', a central section C² and an upper section C³, said sections being flanged and bolted together so that they may be separated from each other to give access to the mechanism contained in the casing as a whole. Each of the drums 8 is adapted to be engaged and held when the spring thereof is fully wound by means of a pawl or detent 68.

The operation of the mechanism hereinabove described may be set forth as follows. Starting with the springs wound under the arrangement shown in Fig. 1, it will be observed that the spring 1 is just starting to wind, the drum 8 thereof being actuated by the gear 12 and the clutch elements 18 and 19. While the spring 1 is thus being wound, all of the remaining springs are exerting their power on the main shaft 7. The shaft 7 operates through the elements 61, 58 and 57 to turn the overrunning clutch 55 which grips and turns the winding shaft 11, said winding shaft 11 having all of the clutches 21 feathered to rotate therewith as previously described. The shaft 11 in turning causes the pinion 70 to drive the large spur gear 71 which in turn drives a small pinion 72 meshing with a gear 73 carrying a pinion 74 which meshes with a gear 75, the last named gear carrying the pinion 54 which meshes with the wheel 53 and causes the sprocket wheel 51 by means of the chain 50 to drive the sprocket wheel 49 and thereby the cam shaft 27. This forms a reducing gear between the winding shaft 11 and the cam shaft 27 thereby producing a very slow turning movement of said cam shaft. After this cam shaft has turned through an arc of a predetermined number of degrees, the lever 22 is moved so as to disengage the elements 18 and 19 and throw the elements 18 and 20 into engagement. This starts the winding of the spring 2 and releases the spring 1, the latter having been completely wound and then exerting its stored energy to impart rotary motion to the shaft 7. As shown in Fig. 8, the cams 25 are arranged with their offsets the proper number of degrees apart to effect a successive actuation of the levers 23 so that the springs are wound from the first to the last and then again rewound in the same order. After the winding shaft 11 has turned a predetermined number of revolutions, by means of the pinion 70 and the large gear 71, a pinion 76 at the center of the gear 71, a spur gear 77 on the shaft 46 and the pinion 45 and gear 44 above described, the shaft 43 has been turned sufficiently to cause the shoulder 41ª thereof to act on the roller 40 of the clutch shifting lever 39 thereby throwing in the clutch 34 and through the elements 33, 32 and 29, starting the winding motor A. The motor A now operates through the elements 30, 32, 33, 34, 35, 36, 47 and 48 to drive the winding shaft 11 at a relatively greater speed so that the springs 1 to 6 inclusive are successively rewound. Simultaneously with this relatively rapid rotation of the shaft 11, the cam shaft 27 is driven at a proportionately increased speed by the reducing gearing hereinabove described and starting with the pinion 70 and following through the train of gears 71, 72, 73, 74, 75, 54 and 53, and the spring elements 51, 50 and 49. After a certain predetermined number of revolutions of the shafts 11 and 27, the cam 42 acts on the lever 39 to throw out the clutch 34 thus disengaging the winding engine A from the mechanism of the spring motor. While the winding engine is in operation, the overrunning clutch 55 permits the additional speed imparted to the shaft 11 in the rewinding operation.

A train of gears in the compartment a is used as means for reducing the speed of the cam 42. This is necessarily made in direct connection with the winding shaft 11 since the revolutions of the last named shaft determines the number of revolutions which must be given in order to effect the winding of the springs. When the stored energy in the springs has been reduced to a predetermined minimum, this has been accomplished by means of the unwinding of the springs which requires an unchanging number of revolutions of the main shaft 7. By a predetermined speed reduction leading from the shaft 43 and cam 42, the point 41ª on the cam 42 reaches its extended or projecting point, forcing the lever 39 inward and the clutch 34 into engagement with the clutch member or housing 35, which in turn is in positive engagement with the shaft 36, gears 47 and 48 and winding shaft 11. As this connection by the clutch 34 and 35 is made, the shaft 36, the gears 29 and 32 are revolved rapidly which effects the starting of the winding engine A. As the engine is set in motion, power is transmitted to the shaft 11 either at a higher or lower speed than the automatic arrangement above described, the overrunning clutch being used as a means of allowing an entirely free action of the winding shaft 11. When the spring members have again been wound to their predetermined maximum, the winding engine is disengaged by the predetermined length of the point 41ª of the cam thus throwing the clutch member 34 out of engagement with the clutch member 35 by means of the groove 41 in the cam 42. The engine is disconnected automatically from the spring winding shaft, as this takes place and is then stopped by the operator and held in idleness until the predetermined amount of the stored energy of the springs has again been reduced to a predetermined minimum whereupon the action is repeated. The overrunning clutch in compartment d is the medium for freeing the winding shaft 11 from the main shaft 7 when the speed of the shaft 11 through the winding engine A becomes greater than the fixed gear ratio will permit. The overrunning clutch is shown as of the roller type permitting operation in one direction only and firmly clutching in the opposite direction. The other gearing in the compartment $d$ is intended only to give additional speed required to the driven member with the exception of the elements 60 and 61 which are directly connected to the shaft 61$^a$ and to clutch 62$^a$ which is inserted in the housing or brake drum 63$^a$, brake mechanism just referred to being used for stopping, controlling and regulating the speed of the main shaft 7.

It will of course be understood that several spring motors may be combined and coupled together so that the combined power thereof may be utilized for any desired purpose and that various other changes in the form, proportion and minor details of construction may be resorted to without departing from the principles or sacrificing any of the advantages of the invention.

Having thus described my invention, I claim:—

1. In a multi-phase spring motor, the combination of a main power delivering shaft, a series of convolute energy-storing springs encircling said shaft arranged to transmit their stored energy to said shaft, and all positively connected at their inner extremities to the latter, a spring winding shaft, a series of clutch members normally loose on the winding shaft and each adapted when thrown into operation to wind its respective spring, complemental clutch members keyed to said winding shaft and slidable into and out of engagement with the respective clutch members, and means for shifting said slidable clutch members in succession.

2. In a multiphase spring motor, the combination of a main power delivering shaft, a series of convolute energy-storing springs encircling said shaft arranged to transmit their stored energy to said shaft, and all positively connected at their inner extremities to the latter, a spring winding shaft, a series of clutch members normally loose on the winding shaft and each adapted when thrown into operation to wind its respective spring, complemental clutch members keyed to said winding shaft and slidable into and out of engagement with the respective clutch members, and means for shifting each of said slidable clutch members after its mate has completed a predetermined number of revolutions.

3. In a multi-phase spring motor, the combination of a main power delivering shaft, a series of convolute energy-storing springs encircling said shaft arranged to transmit their stored energy to said shaft, and all positively connected at their inner extremities to the latter, spring winding drums, to which the outer extremities of said springs are attached, a spring winding shaft, normally loose pinions on said winding shaft geared to said drums to actuate the latter, and clutch mechanism for throwing said pinions into and out of engagement with said winding shaft.

4. In a multi-phase spring motor, the combination of a main power delivering shaft, a series of convolute energy-storing springs arranged to transmit their stored energy to said shaft, spring winding drums to which the outer extremities of said springs are attached, a spring winding shaft, normally loose pinions on said winding shaft, clutches for throwing said pinions into and out of engagement with said winding shaft, a cam shaft parallel to the winding shaft, and rocker arms actuated in succession by said cam shaft to shift said clutches.

5. In a multi-phase spring motor, the combination of a main shaft, a series of energy-storing springs encircling said shaft arranged to transmit their stored energy to said shaft and all positively connected at their inner extremities to the latter, a spring winding shaft, gears connecting said winding shaft with the other extremities of the spring, and means operating automatically whereby said main shaft expends a portion of its energy on said winding shaft in winding one spring only at a time.

6. In a multi-phase spring motor, the combination of a main shaft, a series of energy-storing springs encircling said shaft arranged to transmit their stored energy to said shaft and all positively connected at their inner extremities to the latter, a spring winding shaft, gears connecting said winding shaft with the other extremities of the spring, and means operating automatically whereby said main shaft expends a portion of its energy on said winding shaft in winding one spring only at a time, said means operating to cause all of the springs to be wound successively.

7. In a multi-phase spring motor, the combination of a main shaft, a series of energy-storing springs encircling said shaft arranged to transmit their stored energy to said shaft and all positively connected at their inner extremities to the latter, a spring winding shaft, and gears connecting said winding shaft with the other extremities of the spring, and means operating automatically whereby said main shaft expends a portion of its energy on said winding shaft in winding one spring only at a time for a predetermined number of turns.

8. In a multi-phase spring motor, the combination of a main shaft, a series of energy-storing springs arranged to transmit their stored energy to said shaft, a spring winding shaft, means operating automatically whereby said winding shaft expends a portion of its energy in winding one spring only at a time, an auxiliary spring winding motor, and means whereby said auxiliary motor is automatically thrown into operative relation to the spring winding shaft when the total energy of the spring motor has reached a predetermined minimum.

9. In a multi-phase spring motor, the combination of a main shaft, a series of energy-storing springs arranged to transmit their stored energy to said shaft, a spring winding shaft, means operating automatically whereby said winding shaft expends a portion of its energy in winding one spring only at a time, an auxiliary spring winding motor, and means whereby said auxiliary motor is automatically thrown out of operative relation to the spring winding shaft when the energy of the spring motor has reached a predetermined maximum.

In testimony whereof I affix my signature in presence of two witnesses.

BRADFORD COLBERT.

Witnesses:
FRANK TEMPLE,
CHAS. MCMICHAEL.